H. JENKINS.
STOCK FEEDING DEVICE.
APPLICATION FILED NOV. 30, 1907.
901,620.
Patented Oct. 20, 1908.
2 SHEETS—SHEET 1.
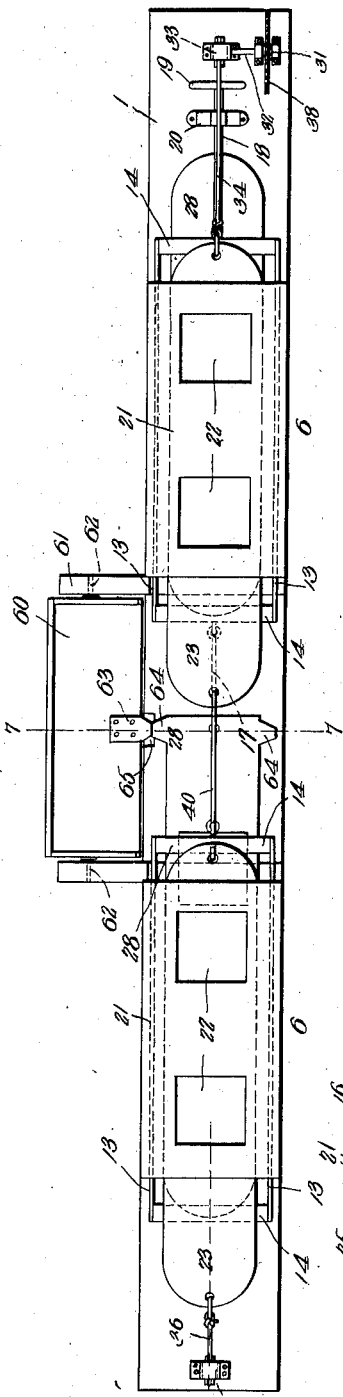
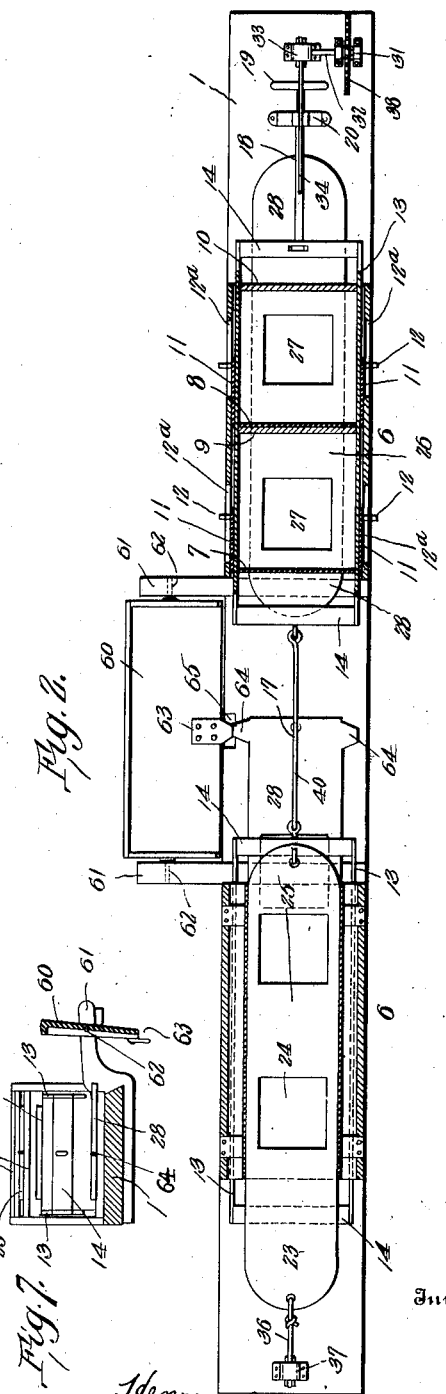
Witnesses
Inventor
Henry Jenkins
By C. J. Stockman
Attorney H. JENKINS.
STOCK FEEDING DEVICE.
APPLICATION FILED NOV. 30, 1907.
901,620.
Patented Oct. 20, 1908.
2 SHEETS—SHEET 2.
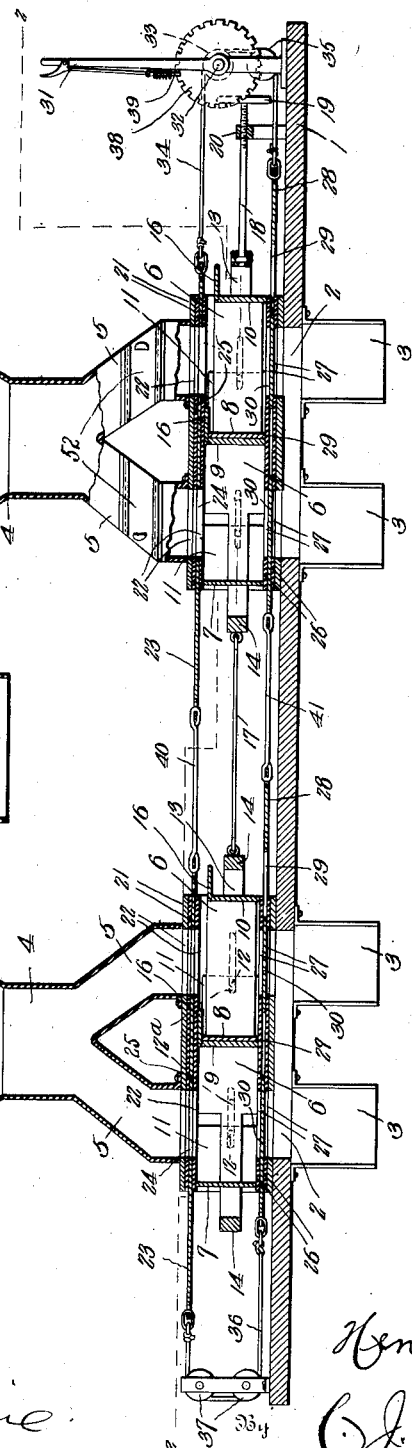
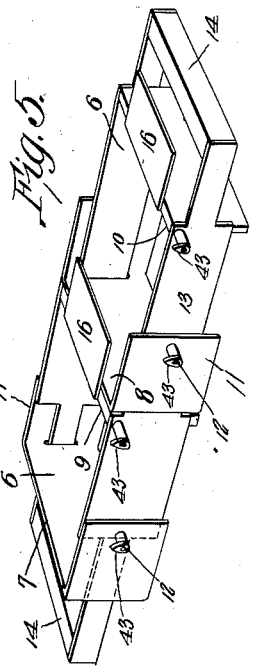
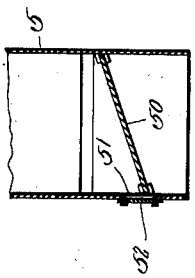
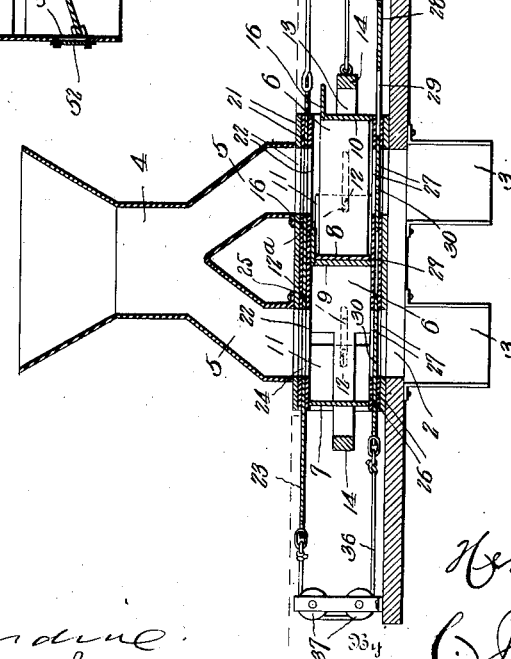
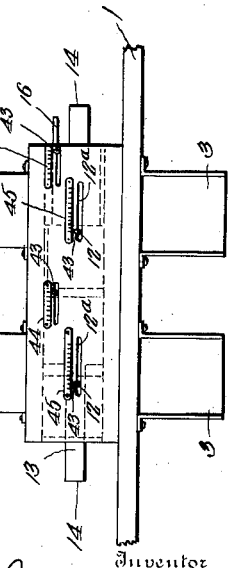

UNITED STATES PATENT OFFICE.

HENRY JENKINS, OF WEIR, KANSAS.

STOCK-FEEDING DEVICE.

No. 901,620.

Specification of Letters Patent.

Patented Oct. 20, 1908.

Application filed November 30, 1907. Serial No. 404,496.

*To all whom it may concern:*

Be it known that I, HENRY JENKINS, a citizen of the United States, residing at Weir, in the county of Cherokee and State of Kansas, have invented certain new and useful Improvements in Stock-Feeding Devices, of which the following is a specification.

This invention relates to devices for feeding animals and consists in certain peculiarities in the construction of parts and in certain novel combinations and arrangements of elements substantially as hereinafter described and particularly pointed out in the subjoined claims.

Among the objects of the invention the following may be specially mentioned, namely:—First, to provide a most simple, practical and efficient means for controlling the supply of feed in measured quantities to a feed trough or troughs. Second, to provide a valve controlled stock feeding device with means whereby the feed may be supplied to the feed trough or troughs in predetermined quantities which may be most readily and easily adjusted to accord with the requirements of the particular animal being fed. Third, to provide a valve-controlled stock feeding device having means whereby the feed may be supplied to the trough in measured quantities, variable to suit the requirements of the particular animal being fed, and with means for indicating the quantity which the measuring box or compartment is set to supply. Fourth, to provide a valve controlled stock feeding device, having means for supplying both hay and grain, and said means provided with a controlling means common to both. These several objects are well accomplished by the construction illustrated in the accompanying drawings, in which:—

Figure 1 is a plan view of a stock feeding device embodying my improvements, with the feed receptacles or hoppers removed, showing the several parts in the positions they normally occupy. Fig. 2 is a longitudinal sectional view thereof on the line 2—2 of Fig. 3. Fig. 3 is a vertical section taken on the line 3—3 of Fig. 1 with the hoppers added. Fig. 4 is a detail view of part of one of the hoppers, showing the means by which feed may be withdrawn from said hopper without passing through the measuring box. Fig. 5 is a detail perspective view of the means in the measuring compartment by which the capacity of said compartment is adjusted. Fig. 6 is a side view of a part of one of the measuring boxes, showing the indicating means. Fig. 7 is a transverse section on the line 7—7 of Fig. 1 showing the hay platform in position to dump the hay.

The same numerals of reference designate the same parts in the several views.

The invention embodied in the present application includes one, or preferably a series of measuring boxes 6 which are supplied with feed from receptacles (preferably hoppers) 4 and lead to chutes 3 which conduct the food to the troughs, respectively. The hoppers are provided with throats 5 each of which lead to a measuring box and is provided with a valve 23 which opens and closes communication of the hopper with the measuring box. The outlet end of each measuring box also is provided with a valve 28, which opens and closes communication of said box with the feed trough. The two valves for controlling the supply of feed to and from the respective measuring boxes are operated by a means hereinafter set forth, which is common to both and is such that it reciprocates the valves reversely, closing the one while it opens the other.

An important feature of the particular mechanism disclosed is that it does not require springs as a part of the operating means, which springs are more or less liable to get out of order, and are therefore unreliable in operation, and add unnecessarily to the cost of production and maintenance of the machine. The hoppers may all be single, or all double, or there may be one or more single hoppers and one or more double hoppers in the connected series (with a corresponding arrangement of measuring boxes and discharge chutes from the measuring boxes) to suit the wishes of the user and to accord with the arrangement of the troughs.

It is generally preferred to provide each measuring box with a pair of measuring compartments, or, as the equivalent thereof, to arrange the boxes in pairs, and because it is preferred, such double arrangement is illustrated and described in this application.

In addition to the features described, each measuring box or compartment is made adjustable so as to vary the quantity of feed to be supplied thereby, and each is provided with means for indicating the places of adjustment for the various quantities to be fed, which means obviously will also indicate the amount which each box or compartment has been adjusted to measure. Furthermore, the device is constructed to permit feed to be withdrawn from any one of the hoppers without passing through the measuring box or compartment supplied thereby and also includes means by which any or more of the devices may be cut out entirely when the trough supplied thereby is in an unoccupied stall, or when for any other reason it is not desired to supply said trough with feed.

A further important feature of the invention consists in providing it with one or more hay platforms or receptacles 60 which are adapted to be tilted to dump their contents into the hay compartments of the feed troughs with which they respectively communicate, and the dumping of which is effected automatically under the control of the means which controls the supply of grain or feed from the measuring boxes. A most simple means for effecting this consists in providing one of the valves of the measuring box with means adapted to engage the hay platform and support it in its non-dumping position and which means in a predetermined movement of said valve releases said platform and permits it to tilt.

Having thus described in general terms the features of the invention, the preferred means for carrying the same into practical effect will now be set forth in detail, reference being had to the accompanying drawings, in which:—

1 designates the support of the system of feeding devices employed, and which support preferably is provided by the floor of a feed room situated above the stall-containing room of a stable or barn. Said floor is provided at intervals with openings 2 from each of which leads a chute or runway 3 to the trough (not shown) beneath. Above each opening is the measuring box 6 and above each measuring box is a hopper 4 having a throat 5 leading to its said box. In the form selected to exemplify the invention, each measuring box 6 is divided into separate measuring compartments and each hopper 4 has a plurality of throats 5 which diverge from each other and lead to the respective compartment of said box.

In order to vary the quantity of feed supplied from each measuring box or compartment each is provided with a slidable section adjustable to cut off any desired portion thereof, and each slidable section is provided with a means which indicates the quantity which the box or compartment has been set to measure, which means preferably comprises a relatively movable pointer and scale one of which partakes of the movement of the slidable section. Moreover, some animals require more feed than others and the present device comprises means by which the capacities of the boxes or compartments can be varied independently of each other so that the particular need of each animal is supplied. Thus in the double arrangement specified, each box 6 is provided with a pair of independently adjustable walls 7 and 8 and with a pair of connected adjustable walls 9 and 10, said walls being so arranged that the opposite ends of one measuring compartment of the box are formed by the walls 7 and 9 while the opposite ends of the other compartment of said box are formed by the walls 8 and 10. In order to facilitate the independent adjustment of the walls 7 and 8 each is preferably provided with side pieces 11 having outward projections 12 which extend through openings 12ª in the sides of the box 6 and may form handles to be grasped by the attendant in the adjustment of said walls by hand. Moreover, as each of these projections 12 is exposed to view it will serve to disclose the position in which the wall attached to it has been adjusted and may coöperate with a suitable scale to indicate the adjustment in units of measure or weight, as hereinafter more fully set forth. The other adjustable walls, 9 and 10, of each box 6 are connected with each other by side pieces 13 which extend through openings in the walls 7 and 8 and throughout the length of the box and project beyond the ends of said box. These side pieces are connected with each other by transverse end pieces 14, thus forming an open frame which carries said walls 9 and 10 and is composed of said side and end pieces. It will now be seen that by adjusting said frame in one or the other direction the end walls 9 and 10 are moved toward or from their companions 7 and 8 respectively, and thereby simultaneously reduce or increase the capacity of the several measuring compartments and correspondingly reduce or increase the amount of the feed of all the animals: and it will be further seen that by adjusting both or either of said end walls 7 and 8 the capacities of the two compartments may be equal or unequal according to whether it is desired to give the different animals the same or different amount of feed at the meal, and that said equality or inequality of the capacities of the two compartments is not varied by any subsequent adjustment of the end walls 9 and 10.

Any suitable means, for example the plates 16 on the adjustable end walls of the compartments, may be provided to act as cutoffs between the throats 5 and the portions of the boxes which are intended to be excluded from use, so as to prevent access of feed to the latter. In practice, there are a series of such boxes 6 according in number and position with the number and position of the troughs with which they are connected by the chutes 3, and the several frames carrying the end walls 9 and 10 are connected for simultaneous operation by rods 17, or other suitable means, and the frame at one end of the feeding apparatus is provided with an actuating device, preferably consisting of a rod 18 suitably attached at one end to the end piece 14 of said frame and provided at its other end with a wheel or handle 19 for convenience in turning it, said rod having a threaded connection between its ends with a bearing 20 whereby it is moved longitudinally when turned, thus imparting similar longitudinal movement to the series of connected walls 9 and 10.

Interposed between the top of each feed box 6 and the outlets from the throats 5 is a frame which forms the top of said box and is composed of two plates or strips 21, of metal or other suitable material, having openings 22 which register with each other and with the throats 5. These strips are preferably secured together throughout their longitudinal edges, by soldering one to the other or by folding the edges of one over the other, or otherwise as preferred, and they are relatively arranged to provide a space between them which receives a slidable plate 23. Said plate is formed with openings 24 and solid places 25 and constitutes a valve which controls the access of feed from said throats 5 to the respective compartments of the feed box 6. The bottom of said box is formed by guide strips 26 similar in relative arrangement to those (21) above specified and having registered openings 27 which constitute the outlets from the measuring compartments, and between said strips reciprocates a valve 28 having two openings 29 and solid places 30 adapted to register with said openings 27 and control the flow of feed therethrough. These valves are operated reversely, so as to close communication of each measuring compartment with the hopper when communication of said compartments with the troughs is open, and vice versa and the valves of the plurality of feed boxes are connected with each other for simultaneous operation by means which comprise an actuating handle or lever 31, which may be located close to or at a distance from the boxes, whichever is preferred, and connecting devices of a kind which avoid the necessity of employing springs. In the particular embodiment shown in the accompanying drawings and preferred by me, said handle or lever 31 is fixedly connected with a shaft 32, which shaft is provided with a pulley 33, to which is secured, or around which is wrapped, a rope or other suitable flexible connecting means 34 the ends of which are attached to the ends of the valves 23 and 28 of the first measuring box and the lower portion of which passes over an idler 35 arranged between said pulley 33 and valve 28, so that in one movement of the lever one end portion of said connecting means will be pulled and move the valve to which it is attached, and the other movement of said lever will, similarly, act on the other end portion of said connecting means and move the other valve. At the opposite end said valves are connected with each other by a rope or other suitable flexible means 36 which passes over an idler or idlers 37, whereby movement of one is communicated to the other in reverse direction. Means are also provided by which the valves are held in adjusted position, preferably comprising a ratchet wheel 38 fixedly connected with said shaft 32 and a pawl 39 to engage the teeth of said wheel. When a series of feeding devices are employed the upper valves 23 will be connected with each other, preferably by rigid rods 40, and the lower valves 28 will be connected with each other, preferably by rigid rods 41.

It will be seen that in the particular embodiment of the invention illustrated and described, to operate the valves from the normal position shown best in Fig. 3 (in which the measuring compartments are in open communication with the hoppers 4 and closed to the chutes 3) when it is desired to supply feed to the troughs, the operator pulls the upper, handle, portion of the lever 31 toward him, thus pulling upon the upper portion of the rope 34 and drawing the upper valves 23 in the same direction and causing the same to close communication of the measuring compartments with the hopper 4 by interposing their solid portions 25 between said compartments and the throats 5. This movement of the upper valves draws the lower valves in the reverse direction and brings their openings 29 into registration with the openings 27 forming the outlets from the respective measuring compartments and thereby opens communication of said compartments with the chutes 3. When said compartments have been emptied and it is desired to resupply the same with feed for the next meal, the operator presses the lever 31 from him, thus drawing the lower valves 29 toward him and interposing their solid portions 30 between the registered openings 27 in the guide strips 26 and at the same time drawing the upper valves 23 backward until communication of the measuring compartments with the hopper is reëstablished.

In order that any of the measuring boxes or compartments may be cut off from use a slide valve or plate 50 is provided for each hopper throat, which valve or plate when across the hopper throat obviously prevents the passage therefrom of feed to the particular box or compartment connected with said throat. Each throat is also provided with an opening 51 which is normally closed by a slide 52 having flanged ends which take over beads or in grooves at the adjacent angles of the throat. By properly moving this slide 52 the opening 51 is exposed and feed may be taken from the hopper through said opening. In practice, it is preferred to arrange the valve or plate 50 at an angle terminating at the lower end of said opening, whereby when the slide 52 is opened and the valve 50 has been inserted the feed in the hopper will be automatically withdrawn without requiring it to pass through the measuring box.

A means which may be employed to indicate the quantities which the several measuring boxes or compartment have been adjusted to contain is indicated in Fig. 6, and comprises a pointer 43 suitably connected to move with the walls 9 and 10 and along a suitable scaled dial or index plate 44 located adjacent thereto on a fixed part of the structure: and other index hands or pointers which move with the walls 7 and 8 across suitably scaled plates or dials 45. The index hands or pointers which coöperate with the dials or plates 45 may be provided or carried by the projections 12 from the walls 7 and 8 as hereinbefore set forth. The scaled plates 44 and 45 will obviously bear such relation to each other that they may be read together to give the quantity measured by the compartment to which they both relate. Thus one (44 for example) may have its scale such as to indicate the capacity accurately when the wall 7 or 8 of its compartment is at its normal position, that is, at the limit of its adjustment away from the wall 9 and 10, and which position may be indicated by zero on the scale 45. Now, assuming that said scale 45 is marked in proper units progressively from the said normal position of the walls 7 and 8 and toward the companion wall 9 or 10, it will be apparent that merely by subtracting the amount indicated on the scale 45 from the amount indicated on the scale 44 the actual capacity of the compartment is found.

The hay platform 60 hereinbefore referred to is pivotally mounted between suitable bearings or supports 61 in which its pivots 62 are journaled, and in the particular and preferred embodiment herein shown it is supported in its non-tilted position by the adjacent valve 28 when the latter is adjusted to close the discharge opening of the measuring box, its forward side being provided, as shown, with a forwardly extending projection 63 which rests upon a similar lateral projection 64 from the contiguous edge of said valve when the latter is in its position referred to. It will be apparent that movement of said valve 28 toward the position which opens the exit aperture from its measuring box will carry its projection 54 out of engagement with the projection 63 of the platform, thus freeing the latter and permitting it to turn into dumping position by the weight of the hay platform. The main support 1 is formed with an opening 65 preferably having a beveled wall through which the projection 63 travels. The weights of the platform at opposite sides of the pivots 62 are preferably so proportioned that when the contents of the platform are dumped the latter will automatically return by gravity to its normal position, with its projection 63 in position to permit the projection 64 to travel to its place beneath it in the return of the valve 28 to its closing position.

Some stock owners or attendants prefer to feed the hay in advance of the grain. It is therefore desirable and preferred to so position the openings 29 in the valve 28 that they will not reach the outlets 27 which they control until after the platform 60 has been dumped, whereby, if desired, a step-by-step movement may be imparted to said valve, the first step thereof releasing the platform and the second step thereof opening the outlet from the grain box and occurring at an interval after said first step, sufficient to allow for the partial or complete consumption of the hay. Such arrangement, however, will not prohibit a continuous movement of the valve when it is desired simultaneously to deliver both grain and hay to the feed trough.

It has been deemed sufficient to show only one hay platform 60, but it will be apparent that the number may be increased and that they may be located at either or both sides of the line of measuring troughs.

It will be apparent that the actuating handle or lever 31 may, if desired, be located in a different room from that containing the measuring boxes or even in a different building from the same. Thus it may be located in the owner's residence, properly located lead pulleys for the flexible connecting means being provided in such event.

Having thus described the invention what I believe to be new and desire to secure by Letters Patent is:—

1. In a stock feeding device, the combination with a feed receptacle, having a measuring compartment beneath the same, and slide valves arranged above and below said measuring compartment, of means for simultaneously operating said valves in reverse directions, comprising an operating lever, flexible connections between said lever and valves, a pulley at the end of the device remote from said lever and a flexible connecting device having its ends secured to said valves and its intermediate part engaged with said pulley.

2. In a stock feeding device, the combination with a plurality of feed receptacles, having a measuring compartment beneath each of the same, and slide valves arranged above and below said measuring compartments, of means for operating said valves, comprising an operating lever, flexible connections between said lever and adjacent valves, a pulley at the end of the device remote from said lever, flexible connecting means having its ends secured to the adjacent upper and lower valves and its intermediate part engaged with said pulley, means connecting the upper valves with each other and means connecting the lower valves with each other.

3. In a stock feeding device, the combination of a measuring box having a plurality of measuring compartments each of which has an inlet opening at its top and an outlet opening at its bottom, a valve covering the top of said box and provided with a plurality of openings adapted to register with the inlet openings to said compartments to admit feed thereto and with a plurality of solid portions adapted to cover said openings to exclude feed therefrom, a valve covering the bottom of said box and having a plurality of openings and solid portions adapted to register with the outlet openings from said compartments, and means for sliding said valves simultaneously in reverse directions comprising an operating lever, connections between the same and said valve, said connections including a flexible connecting device attached to said valves, a pulley at the end of the device remote from said lever and a flexible connecting device having its ends secured to the contiguous ends of the valves and its intermediate part engaged with said pulley.

4. In a stock feeding device, the combination of a plurality of measuring boxes each having a plurality of measuring compartments and each of which compartments has an inlet opening at its top and an outlet opening at its bottom, a valve covering the top of each box and provided with a plurality of openings adapted to register with the inlet openings to said compartments and with a plurality of solid portions adapted to cover said openings, to admit feed to and exclude it from said compartments, respectively, a valve covering the bottom of each of said boxes and having a plurality of openings and solid portions adapted to register with the outlet openings from said compartments, and means for sliding said valves simultaneously in reverse directions, comprising an actuating device connected with said upper and lower valves, means for connecting the valves with each other at the end of the device remote from said actuating device, and means connecting the lower valves with each other.

5. A stock feeding device comprising a measuring box having an inlet and an outlet, valves for controlling the inlet to and the outlet from said box, and means for operating said valves simultaneously in reverse directions, said operating means comprising an actuating lever, connections between the same and the contiguous ends of the valves, and means connecting the other ends of said valves with each other and adapted to transmit motion from one to the other in reverse directions.

6. A stock feeding device comprising a measuring box having an inlet and an outlet, valves for controlling the inlet to and the outlet from said box, and means for operating said valves simultaneously in reverse directions, said operating means comprising an actuating lever, a shaft with which said lever is fixedly connected, a pulley on said shaft, flexible connections engaged with said pulley and having ends secured to contiguous ends of the valves, and means connecting the other ends of said valves with each other and adapted to transmit motion from one to the other in reverse directions.

7. A stock feeding device comprising a measuring box having an inlet and an outlet, valves for controlling the inlet to and the outlet from said box, and means for operating said valves simultaneously in reverse directions, said operating means comprising an actuating lever, a shaft with which said lever is fixedly connected, a pulley on said shaft, flexible connections engaged with said pulley and having ends attached to contiguous ends of the valves, a ratchet fixedly connected with said shaft, a pawl to engage said ratchet, and means connecting the other ends of said valves with each other and adapted to transmit motion from one to the other in reverse directions.

8. A stock feeding device, comprising a measuring receptacle having a slidable wall and an inlet and an outlet side, a slidable valve controlling the inlet side of the receptacle, a slidable valve controlling the outlet side of the receptacle, said valves arranged above and below said wall, and means for transmitting movement from one valve to the other, in reverse direction.

9. A stock feeding device comprising a measuring receptacle having a plurality of walls each mounted to slide toward the other and independently of said other, said receptacle also having an inlet to and an outlet from the space between its walls, slidable valves respectively controlling said inlet and outlet and means for transmitting movement from one valve to the other, in reverse direction.

10. A stock feeding device provided with means arranged to form a plurality of measuring compartments, said means including an element in each compartment adjustable to vary the capacity thereof, and means connecting the adjustable elements with each other for unitary movement.

11. A stock feeding device comprising walls arranged to provide a plurality of measuring compartments and a slidable frame connected with a wall of each compartment.

12. A stock feeding device provided with a plurality of measuring compartments each of which has an adjustable wall, and a slidable frame carrying another wall of each of the plurality of compartments.

13. A stock feeding device comprising a box having walls forming therein a plurality of measuring compartments, each having an inlet thereto and an outlet therefrom, valves for controlling the inlets and outlets, one wall of each compartment being adjustable and means connecting the adjustable walls with each other for unitary movement.

14. A stock feeding device comprising a box having walls forming therein a plurality of measuring compartments each having a plurality of independently adjustable walls, and means connecting one wall of one compartment with a wall of the other compartment, for unitary adjustment.

15. A stock feeding device having a plurality of measuring compartments each of which is provided with a plurality of independently adjustable walls, means connecting one wall of each compartment with a like wall of another compartment, for unitary movement, others of said adjustable walls being free from connection with each other.

16. A stock feeding device comprising a plurality of measuring boxes each having a slidable wall, an adjustable means for said walls connected with one of the same and means connecting said walls with each other whereby they are moved simultaneously.

17. A stock feeding device comprising a plurality of measuring boxes each having a plurality of measuring compartments, a slidable frame for each box provided with a plurality of walls each of which constitutes an adjustable wall of one compartment, adjustable means secured to one of said frames and means connecting the plurality of frames with each other.

18. A stock feeding device comprising a plurality of measuring boxes each of which has a plurality of measuring compartments, each of said compartments having a wall and each of said walls being adjustable independently of the other, a slidable frame in each box, each frame provided with a plurality of walls each of which constitutes an adjustable wall of a compartment, and means for adjusting said frames simultaneously.

19. A stock feeding device having a measuring compartment open at the top and bottom and composed of a three-sided frame and a wall, said frame and wall having slidable connection with each other, and valves for said open top and bottom.

20. A stock feeding device having a measuring compartment open at the top and bottom and composed of a three-sided frame and a wall, said frame and wall having slidable connection with each other, valves for said open top and bottom and a plurality of indicating means, each having an element movable with said frame and wall, respectively.

21. In a stock feeding device, the combination with a measuring compartment having valvular means for controlling the supply of feed thereto and therefrom, of means from which said compartment is supplied, comprising a receptacle having an opening and an inclined cut-off movable across said receptacle and adapted to conduct the feed to said opening, for the purpose specified.

22. A stock feeding device, comprising a grain box, having a valve, and a tiltable hay platform, said valve having means whereby it supports the platform in non-dumping position when in one of its positions and removes such supports in its adjustment to another position.

23. A stock feeding device comprising a grain box having an outlet and a valve controlling its outlet, a tiltable hay platform supported in non-dumping position by said valve when the latter is closed, and means for operating said valve to open said outlet and release said platform.

24. A stock feeding device, comprising a grain box having an outlet and a valve controlling its outlet, said valve provided with a lateral projection, a tiltable hay platform having a projection to engage said projection from the valve and whereby said platform is supported in non-dumping position by said valve when the latter is closed, and means for operating said valve to open said outlet and release said platform.

In testimony whereof I affix my signature, in presence of two witnesses.

HENRY JENKINS.

Witnesses:
JAMES RIDDLE,
JOHN JEWERS.